(12) United States Patent
Kiyomiya et al.

(10) Patent No.: US 7,521,272 B2
(45) Date of Patent: Apr. 21, 2009

(54) DISPLAY DEVICE PRODUCING METHOD AND DISPLAY DEVICE PRODUCING DEVICE

(75) Inventors: Tadashi Kiyomiya, Tokyo (JP); Shunichi Hashimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 196 days.

(21) Appl. No.: 10/514,756

(22) PCT Filed: Mar. 12, 2004

(86) PCT No.: PCT/JP2004/003308

§ 371 (c)(1), (2), (4) Date: Nov. 17, 2004

(87) PCT Pub. No.: WO2004/083950

PCT Pub. Date: Sep. 30, 2004

(65) Prior Publication Data

US 2005/0255618 A1 Nov. 17, 2005

(30) Foreign Application Priority Data

Mar. 18, 2003 (JP) .............................. 2003-073247

(51) Int. Cl.
*H01L 21/00* (2006.01)
(52) U.S. Cl. .............................. 438/26; 438/30; 438/455
(58) Field of Classification Search .................... 438/26, 438/30, 455
See application file for complete search history.

(56) References Cited

U.S. PATENT DOCUMENTS 6,290,793 B1 9/2001 Lovas et al.

FOREIGN PATENT DOCUMENTS

JP 61-219932 9/1986

(Continued)

OTHER PUBLICATIONS

European Search Report issued on Jul. 12, 2007.

*Primary Examiner*—Jack Chen
(74) *Attorney, Agent, or Firm*—Sonnenschein Nath & Rosenthal LLP

(57) ABSTRACT

Provided are a manufacturing method which can efficiently manufacture a display device with higher image quality, and a manufacturing apparatus which can be applied to the manufacturing method. Position adjustment is carried out so that a seal pattern (4) formed on at least one of a bottom substrate (2) and a top substrate (7) and having a shape along an outer edge of each of a plurality of display panels (1) coincides with a projected portion pattern (27) (29) formed on at least one of a pair of parallel surfaces (19S) (20S) in a bottom surface plate (19) and a top surface plate (20) and having a planar shape corresponding to the seal pattern (4), and pressure is applied to the bottom substrate (2) and the top substrate (7) in a Z direction by the bottom surface plate (19) and the top surface plate (20). Therefore, a gap between the bottom substrate (2) and the top substrate (7) in an effective screen area (3) can be formed more uniformly, and a display device with higher image quality can be efficiently manufactured.

14 Claims, 11 Drawing Sheets

FOREIGN PATENT DOCUMENTS

| | | |
|---|---|---|
| JP | 64-61729 | 3/1989 |
| JP | 01-156718 | 6/1989 |
| JP | 08-313917 | 11/1996 |
| JP | 10-3083 | 1/1998 |
| JP | 10-274946 | 10/1998 |
| JP | 11-95181 | 4/1999 |
| JP | 2000-047229 | 2/2000 |
| JP | 2001-282125 | 10/2001 |
| JP | 2003-29232 | 1/2003 |
| JP | 2003-029232 | 1/2003 |

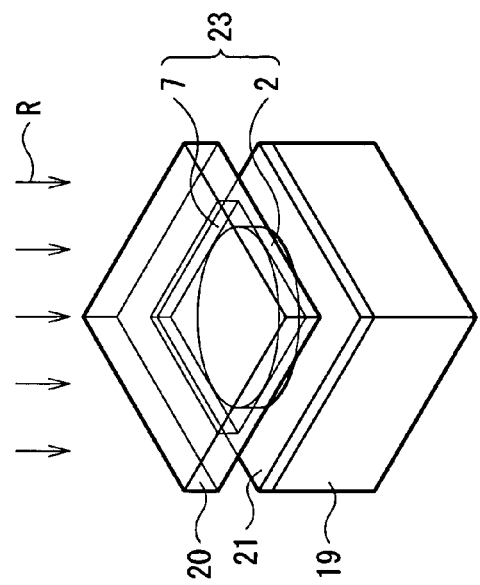
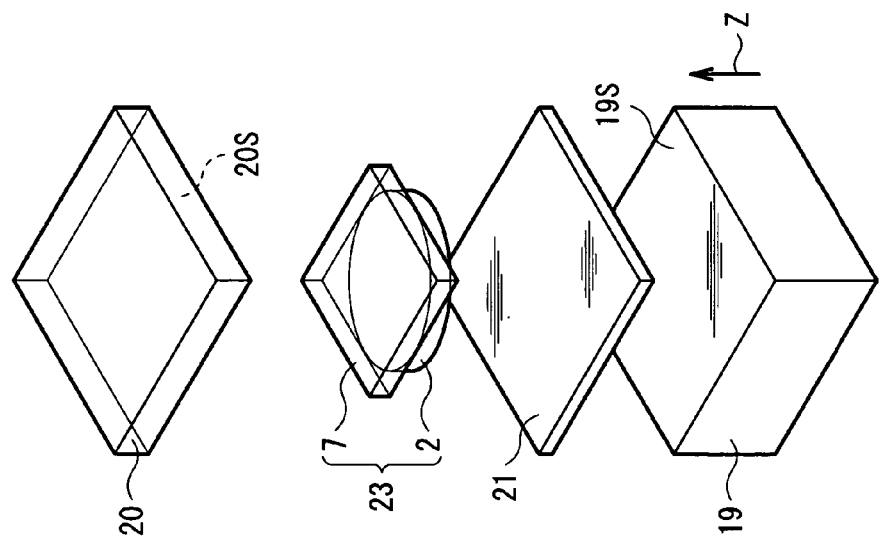
FIG. 5B
FIG. 5A

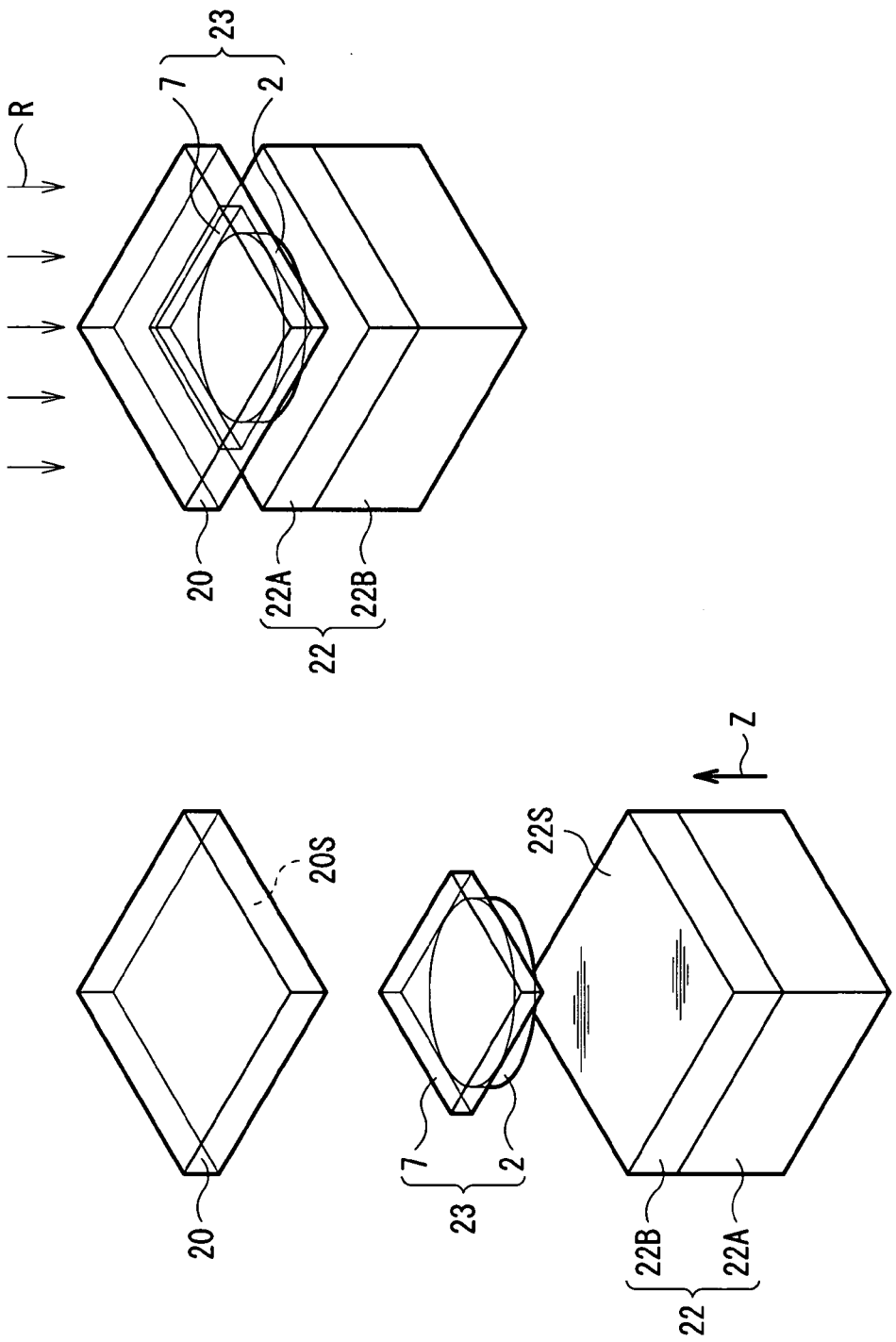

DISPLAY DEVICE PRODUCING METHOD AND DISPLAY DEVICE PRODUCING DEVICE

The present invention relates to a method of manufacturing a display device capable of displaying a high-quality image, and a display device manufacturing apparatus used in the method of manufacturing the display device.

In recent years, as a reduction in weight and profile of electronic display devices has been in increasing demand, various kinds of electronic display devices such as light emitting diodes (LEDs), plasma display panels (PDPs) and liquid crystal displays (LCDs) have been developed.

Among the electronic display devices, specifically LCDs have characteristics such as high image quality, low profile, light weight and low power consumption, and LCDs are used for a large number of end products such as clocks, televisions, personal computers and projectors, so compared to other electronic display devices, LCDs are used in various application areas. A typical LCD has, for example, a structure in which a liquid crystal material is sandwiched between a pair of glass substrates, and in order to obtain higher image quality, it is specifically important to have as uniform a space (which is called gap) between the pair of glass substrates as possible throughout an effective screen area.

The above gap between the glass substrates is determined in a bonding step in a method of manufacturing the LCD. Conventionally, in the bonding step, after an alignment film and a seal pattern are formed on facing surfaces of the pair of glass substrates, the glass substrates are bonded together with, for example, a spherical spacer (bead) with a certain diameter in between, and then pressure is applied to them, and the seal pattern is cured (refer to, for example, Japanese Unexamined Patent Application Publication No. Hei 6-331993). In this case, the alignment film is formed on the whole surface of a portion which will be a display area (effective screen area), and the seal pattern is formed so that the effective screen area is surrounded with the seal pattern, and the seal pattern has a liquid crystal inlet in a part thereof. As the seal pattern, an ultraviolet (UV) curable resin, a thermosetting resin or the like is generally used. A glass substrate is placed on each of a pair of surface plates which face each other and each has a flat surface, and in a state where a pressure of approximately 1 kg/cm$^2$ is uniformly applied to the whole glass substrates, the seal pattern is cured so as to form the gap. At this time, in the case where the UV curable resin is used as the material of the seal pattern, in order to allow the seal pattern to be irradiated with ultraviolet rays, as a surface plate on a side closer to one substrate, a material with high UV transmittance such as quartz glass is used. As a surface plate on a side closer to the other substrate, in order to uniformly apply pressure to the glass substrates, a metal plate with high flatness or a metal plate to which a buffer material with elasticity such as rubber is attached is used. Further, in a state where pressure is uniformly applied to the glass substrates, UV rays are applied to cure the UV curable resin, thereby the gap is formed (UV press method using plate). On the other hand, in the case where the thermosetting resin is used as the seal pattern, as both surface plates, for example, a metal plate capable of easily obtaining parallelism on which a thin buffer material with low hardness, and elasticity is used. Thereby, bias of the distribution of pressure applied to the glass substrates is minimized. Moreover, in a state where pressure is uniformly applied to the glass substrates, heat is applied to cure the thermosetting resin, thereby the gap is formed.

However, in the case where the gap is formed by using the above spacer, the following problem arises. At first, in the case where the spacer is not dispersed in the effective screen area, that is, the case where the spacer is disposed only in the seal pattern, when pressure is uniformly applied to the pair of glass substrates, the pressure is applied to not only the seal pattern including the spacer but also the effective screen area in which no spacer is included, so the glass substrates in the effective screen area are dented, thereby as a result, a problem that an uniform gap is not formed arises. Specifically in the case of having a large effective screen area, a noticeable dent is made. Moreover, in the case where the spacer is uniformly dispersed in not only the seal pattern but also the whole effective screen area, an uniform gap can be formed; however, there may be cases where such an adverse effect that misalignment around the spacer during operation, for example, passage of light occurs, or the spacer is visually recognized is exerted on image quality.

SUMMARY OF THE INVENTION

In view of the foregoing, it is an object of the invention to provide a method of manufacturing a display device in which a display device capable of displaying a higher-quality image can be efficiently manufactured, and a display device manufacturing apparatus which can be applied to the method of manufacturing a display device.

In a method of manufacturing a display device according to the invention, the display device comprises a predetermined display panel, and the method comprises: a seal pattern forming step of forming a seal pattern along an outer edge of a display area in each of a plurality of the display panels on at least one of a pair of facing surfaces of a first substrate and a second substrate facing each other; a position adjusting step of using a pair of surface plates having a pair of parallel surfaces on at least one of which a projected portion pattern with a planar shape corresponding to the seal pattern is formed to adjust positions of the first substrate and the second substrate between the pair of parallel surfaces so that the seal pattern coincides with the projected portion pattern; and a bonding step of bonding the first substrate and the second substrate arranged in the position adjusting step together through applying pressure to the first substrate and the second substrate in a direction vertical to the parallel surfaces by the pair of surface plates so as to have a predetermined space between the first substrate and the second substrate, and curing the seal pattern.

In the method of manufacturing a display device according to the invention, the positions of the first substrate, the second substrate and the pair of surface plates are adjusted so that the seal pattern formed along the outer edge of a display area in each of a plurality of display panels coincides with the projected portion pattern with a planar shape corresponding to the seal pattern, and pressure is applied to the first substrate and the second substrate in a direction vertical to the parallel surfaces by the pair of surface plates. Therefore, while pressure is hardly applied to areas of the first substrate and the second substrate corresponding to an effective screen area in each of a plurality of display panels, pressure can be uniformly and strongly applied to all areas corresponding to the seal patterns.

In a display device manufacturing apparatus according the invention, the display device comprises a predetermined display panel, and the display device manufacturing apparatus comprises: a pair of surface plates having a pair of parallel surfaces on at least one of which a projected portion pattern with a planar shape corresponding to a seal pattern along an outer edge of a display area in each of a plurality of the display panels is formed; a position adjusting means of adjusting the positions of a first substrate and a second substrate having a pair of facing surfaces on at least one of which the seal pattern is formed between the pair of parallel surfaces so that the seal pattern coincides with the projected portion pattern; and a bonding means of bonding the first substrate and the second substrate arranged in the position adjusting means together through applying pressure to the first substrate and the second substrate in a direction vertical to the parallel surfaces by the pair of surface plates so as to have a predetermined space between the first substrate and the second substrate, and curing the seal pattern In the display device manufacturing apparatus, the positions of the first substrate, the second substrate and the pair of surface plates are adjusted so that the seal pattern formed along the outer edge of a display area in each of a plurality of display panels coincides with the projected portion pattern with a planar shape corresponding to the seal pattern, and pressure is applied to the first substrate and the second substrate in a direction vertical to the parallel surfaces by the pair of surface plates. Therefore, while pressure is hardly applied to areas of the first substrate and the second substrate corresponding to an effective screen area in each of a plurality of display panels, pressure can be uniformly and strongly applied to all areas corresponding to the seal patterns.

BRIEF DESCRIPTION OF THE DRAWINGS

FIGS. 5A and 5B are schematic views of a display device manufacturing apparatus for the display device shown in FIGS. 1A and 1B;

FIGS. 11A and 11B are schematic views of a display device manufacturing apparatus according to a second embodiment of the invention.

DETAILED DESCRIPTION OF THE PRESENTLY PREFERRED EMBODIMENTS

First Embodiment

A first embodiment of the invention will be described below referring to the accompanying drawings.

At first, referring to FIGS. 1A and 1B, the structure of a display device according to the embodiment of the invention will be described below.

Figure 1A:
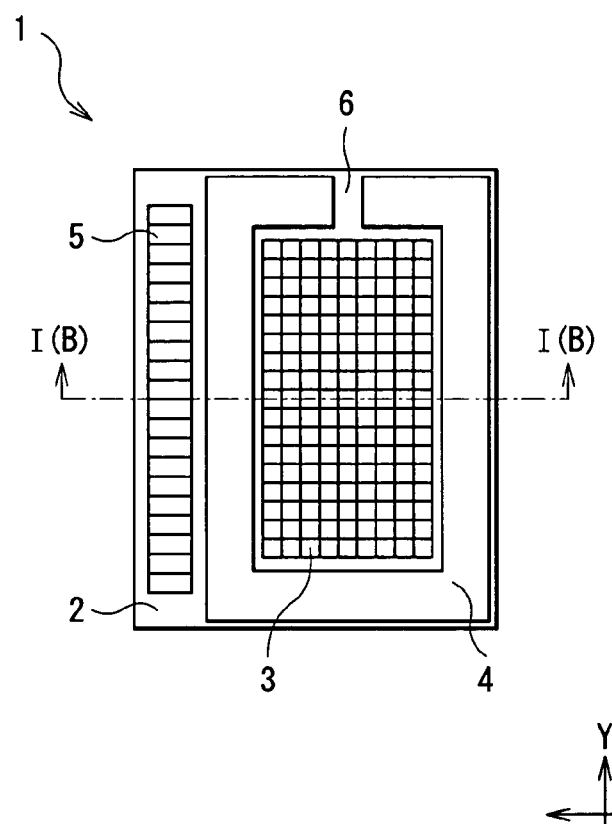
FIGS. 1A and 1B are a schematic plan view and a schematic sectional view of a display panel included in a display device according to a first embodiment of the invention.
Figure 1B:
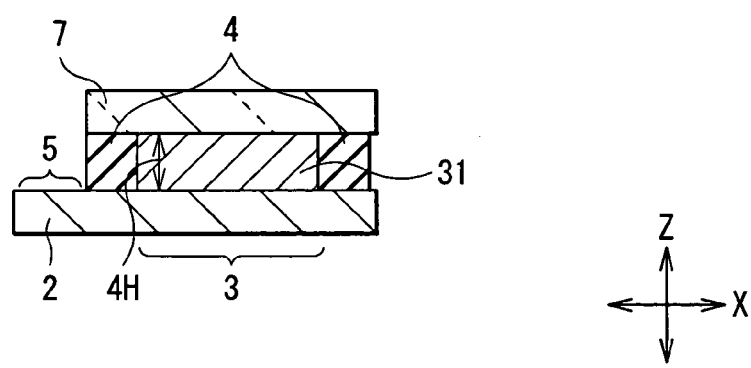

FIGS. 1A and 1B show the structure of a display panel 1 which is a main part of the display device according to the embodiment. FIG. 1A shows a plan view viewed from directly above, and FIG. 1B is a sectional view taken along a line I(B)-I(B) of FIG. 1A in an arrow direction. The display panel 1 is formed as an active-matrix reflective liquid crystal display device. In FIG. 1A, for convenience of understanding, a top substrate 7 (which will be described later) is now shown.

As shown in FIGS. 1A and 1B, the display panel 1 comprises a rectangular bottom substrate 2 and the rectangular top substrate 7, and a display portion 31 and a seal pattern 4 which are sandwiched between the bottom substrate 2 and the top substrate 7. A space between the bottom substrate 2 and the top substrate 7, that is, a gap 4H is, for example, approximately 2.0 µm. Moreover, the display panel 1 can be separated into two main parts, that is, an effective screen area 3 and an electrode pad area 5. In the effective screen area 3, a plurality of pixels are formed in a matrix, and the effective screen area 3 is an area where an image is actually displayed, and is surrounded with the seal pattern 4 with a strip shape. In the electrode pad area 5 separated from the effective screen area 3 by the seal pattern 4, an extraction electrode for connection to outside is formed. In the top substrate 7, a portion corresponding to the electrode pad area 5 does not exist.

The bottom substrate 2 is, for example, a substrate of silicon (Si) or the like on which a semiconductor device or the like is formed, and has a thickness of approximately 0.7 mm. The top substrate 7 is made of a material with high ultraviolet (UV) transmittance such as glass, and has a thickness of, for example, 0.7 mm. The seal pattern 4 is an adhesive layer formed along an outer edge of the effective screen area 3, and is provided to prevent a liquid crystal layer 18 (which will be described later) as a component of the display portion 31, with which the effective screen area 3 is filled, from being leaked to outside by sealing, and to bond the bottom substrate 2 and the top substrate 7 together. The seal pattern 4 is made of, for example, an ultraviolet (UV) curable resin, and includes a spherical spacer 4A with a certain diameter. The spacer 4A corresponds to a specific example of "a space adjusting member" in the invention. Moreover, the seal pattern 4 has a liquid crystal inlet 6 as an opening in a part thereof. The liquid crystal inlet 6 is provided to inject the liquid crystal layer 18 in a step of manufacturing the display panel 1, and the liquid crystal inlet 6 is sealed with a sealing member (not shown). The display portion 31 is formed in the effective screen area 3, and includes the liquid crystal layer 18 and so on. The display portion 31 will be described in more detail below.

Next, referring to FIG. 2, the sectional structure of the effective screen area 3 will be described in more detail below.

Figure 2:
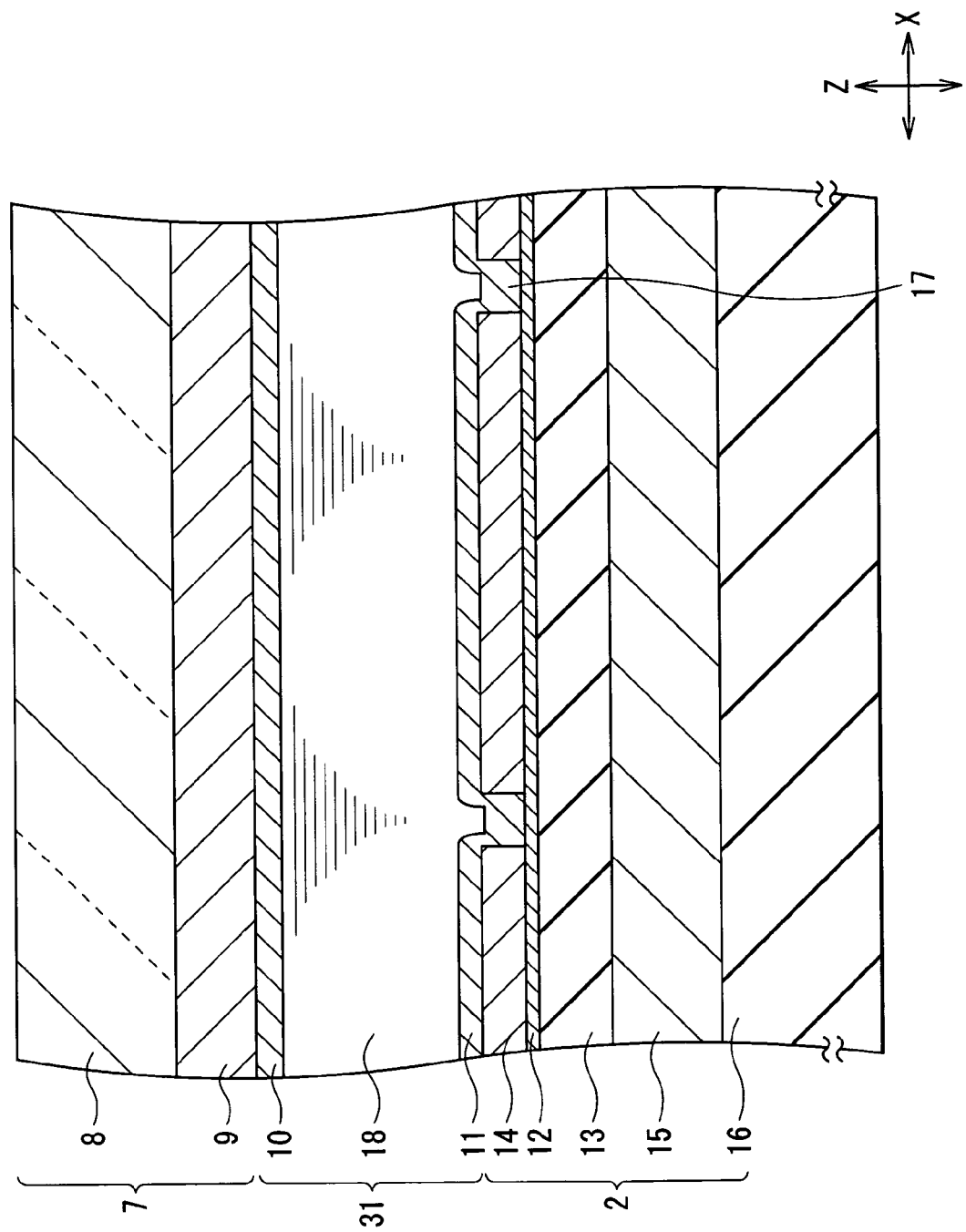
FIG. 2 is a sectional view of a main part of the display panel shown in FIGS. 1A and 1B.

FIG. 2 is an enlarged sectional view showing a part of the effective screen area 3 of the display panel 1 shown in FIGS. 1A and 1B, and the effective screen area 3 has a structure in which the bottom substrate 2, the display portion 31 and the top substrate 7 are laminated in order. As shown in FIG. 2, the top substrate 7 includes a glass substrate 8 and a transparent electrode 9 which is formed on a side of the top substrate 7 closer to the bottom substrate 2 through evaporation or the like. The glass substrate 8 is made of, for example, non-alkali glass containing no alkali. The transparent electrode 9 is made of ITO (Indium Tin Oxide) which is an alloy oxide of indium (In) and tin (Sn), or the like, and is specifically provided to secure electrical conductivity while securing visible light transmittance. The transparent electrode 9 functions as a current path for applying a voltage to the liquid crystal layer 18 together with a reflective pixel electrode 14 (which will be described later) to control the action of liquid crystal molecules included in the liquid crystal layer 18. The thinner the thickness of the liquid crystal layer 18 is, the more the response time of the liquid crystal molecules when a predetermined voltage is applied is reduced, so the liquid crystal molecules can be controlled at high speed.

The display portion 31 includes an alignment film 10, the liquid crystal layer 18 and an alignment film 11 which are formed on the transparent electrode 9 in order from a side closer to the top substrate 7. The liquid crystal layer 18 is made of predetermined liquid crystal molecules, and the liquid crystal molecules are selected depending upon applications, performance requirements and the like. The alignment films 11 and 10 function to align the liquid crystal molecules of the liquid crystal layer 18 to a certain direction, and have a groove in a predetermined direction. As the material of the alignment films 11 and 10, for example, a fired polyimide varnish or an evaporated inorganic material (vertical alignment film or the like) is used.

The bottom substrate 2 includes a Si substrate 16 made of a silicon single crystal wafer, a CMOS device 15 as a semiconductor device for display control, an insulating layer 13, a base layer 12 and the reflective pixel electrode 14 in order from a side farther from the top substrate 7. The base layer 12 has, for example, a three-layer structure (TiN/Ti/TiN) in which a titanium film is sandwiched between two titanium nitride films, and functions to help the formation of the reflective pixel electrode 14 (specifically to improve the adhesive strength) in a manufacturing step. In the reflective pixel electrode 14, a pixel groove 17 is formed in a laminate surface so as to separate the reflective pixel electrode 14 into individual pixels. The pixel groove 17 extends in a direction vertical to a paper plane, and is filled with the alignment film 11. A space between the pixel grooves 17 is, for example, approximately 8 to 9 μm. Moreover, the reflective pixel electrode 14 is separated by a groove extending in a direction parallel to the paper plane in the laminate surface. It is preferable that the reflective pixel electrode 14 is made of, for example, aluminum (Al) or the like exhibiting high reflectivity in a visible light region through sputtering or the like, and has a thickness approximately from 100 to 150 nm so as to sufficiently function as a reflective plate and an electrode.

Moreover, the bottom substrate 2 and the top substrate 7 preferably have a surface roughness of 0.2 μm or less. It is because if the surface roughness is larger than 0.2 μm, it is difficult to uniformly apply pressure to portions of the bottom substrate 2 and the top substrate 7 corresponding to the seal pattern 4 in a bonding step of a manufacturing method which will be described later.

Further, in the display panel 1 as such a reflective liquid crystal display device, light incident from the top substrate 7 is modulated to display an image, so when the spacer 4A is disposed near the reflective pixel electrode 14 so as to have a uniform space between the bottom substrate 2 and the top substrate 7, the spacer 4A is visibly recognized. Therefore, it is preferable that no spacer 4A is disposed in the effective screen area 3.

Next, referring to FIGS. 3 through 8, a method of manufacturing a display device and a display device manufacturing apparatus according to the embodiment will be described below.

Figure 3:
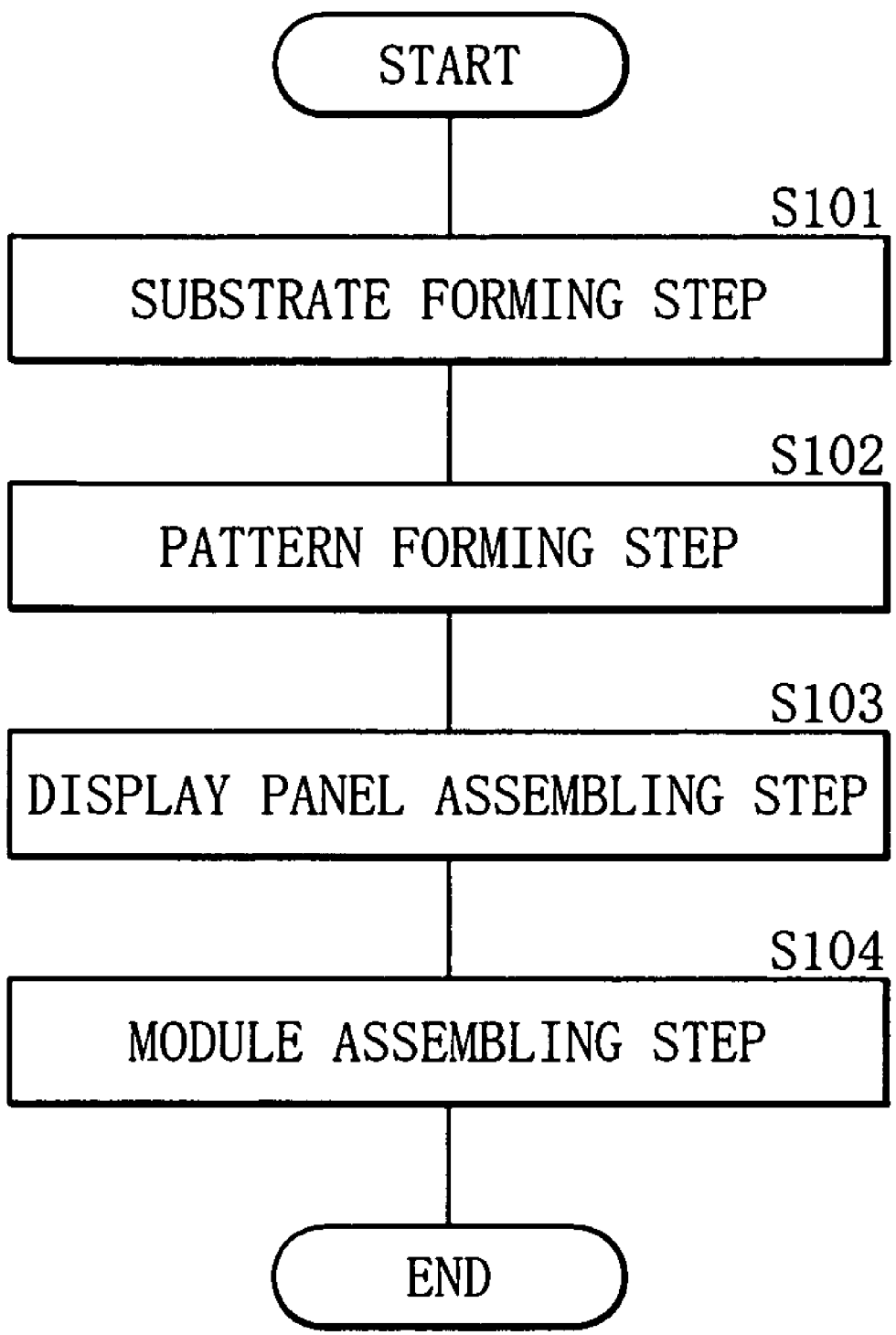
FIG. 3 is an overall flow chart of steps in a method of manufacturing the display device shown in FIGS. 1A and 1B.

FIG. 3 shows an overall flow chart of steps in the method of manufacturing a display device according to the embodiment. As shown in FIG. 3, the method of manufacturing a display device according to the embodiment is broadly divided into four steps (steps S101 through S104), that is, a substrate forming step (step S101), a pattern forming step (step S102), a display panel assembling step (step S103) and a module assembling step (step S104).

The substrate forming step (step S101) is a step of forming the Si substrate 16 in the bottom substrate 2 and the top substrate 7 in the display panel 1 which is a main part of the display device. The bottom substrate 2 is obtained, for example, through cutting a silicon wafer with a predetermined thickness from a silicon single crystal ingot by slicing, and then mirror-polishing the wafer by a polishing apparatus or the like. The top substrate 7 is formed, for example, through forming the transparent electrode 9 on the glass substrate 8 processed by a float process by vacuum evaporation of ITO or the like.

The next pattern forming step (step S102) is a step of laminating the CMOS device 15, the insulating layer 13, the base layer 12 and the reflective pixel electrode 14 in order on the Si substrate 16 of the bottom substrate 2 which is prepared in the substrate forming step (step S101) so as to form a predetermined flat pattern. In this case, patterning is carried out corresponding to each pixel in a portion which will be the effective screen area 3. Thereby, the bottom substrate 2 is completed for the meantime.

Figure 4:
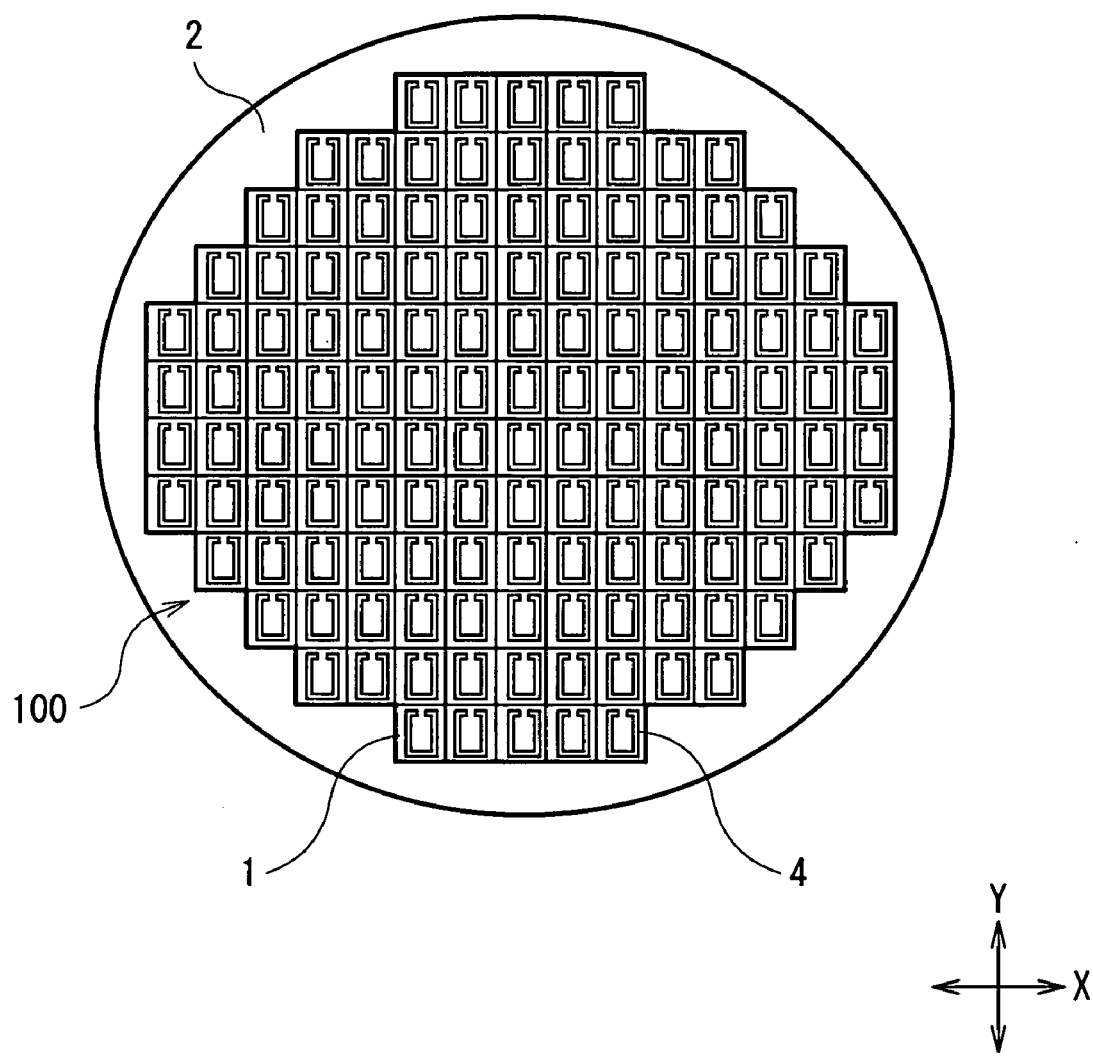
FIG. 4 is a plan view in a step among the steps shown in FIG. 3.

The next display panel assembling step (step S103) is a step relating to a main characteristic part of the invention, and a step of assembling the display panel 1 which is a main part of the display device. In the step, as shown in FIG. 4, a plurality of display panels 1 are collectively formed on one bottom substrate 2. FIG. 4 shows a state in the middle of forming a display panel group 100 including a plurality of display panels 1 on the bottom substrate 2, and the seal pattern 4 is formed on each area where the display panel 1 is formed. The step will be described in more detail later.

The last module assembling step (step S104) is a step of attaching a drive part or the like for driving the display device to the display panel 1 assembled in the display panel assembling step (step S103) so as to form a finished product.

Referring to FIGS. 5A and 5B, a bonding apparatus as the display device manufacturing apparatus according to the embodiment used in the display panel assembling step (step S103) will be described below. FIGS. 5A and 5B show schematic views of the bonding apparatus applied to the method of manufacturing a display device according to the embodiment, and FIG. 5A shows an opened state before applying pressure, and FIG. 5B shows a state of applying pressure. As shown in FIGS. 5A and 5B, the bonding apparatus according to the embodiment comprises a bottom surface plate 19 having a parallel surface 19S and a top surface plate 20 having a parallel surface 20S facing the parallel surface 19S, a position adjusting means of arranging the bottom substrate 2 and the top substrate 7 in predetermined positions between the bottom surface plate 19 and the top surface plate 20, and a bonding means of applying pressure to the bottom substrate 2 and the top substrate 7 in a direction vertical to the parallel surfaces 19S and 20S (Z direction) by the bottom surface plate 19 and the top surface plate 20, and curing the seal pattern 4.

Figure 6:
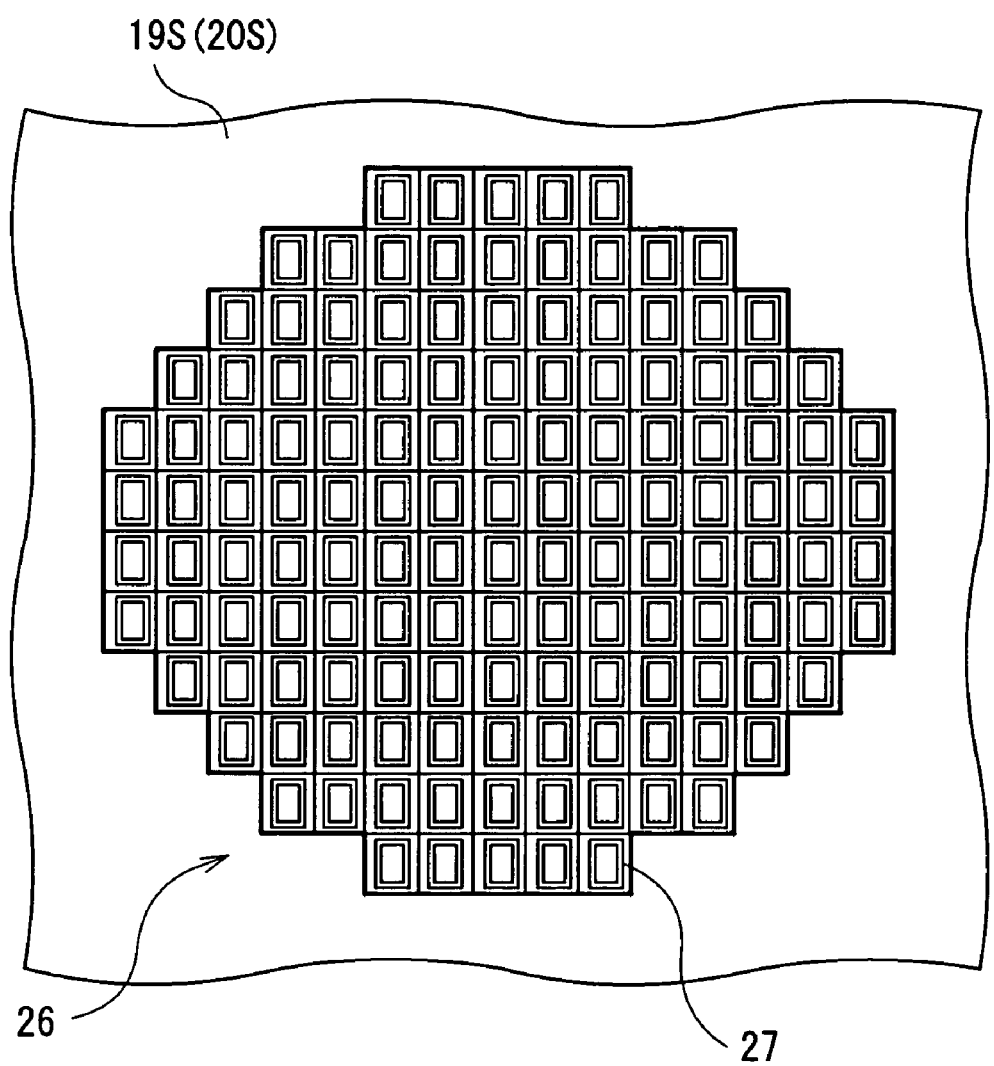
FIG. 6 is a plan view of a main part of the display device manufacturing apparatus shown in FIGS. 5A and 5B.
Figure 6:
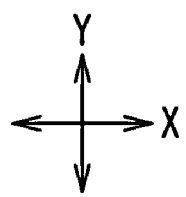
Figure 7A:
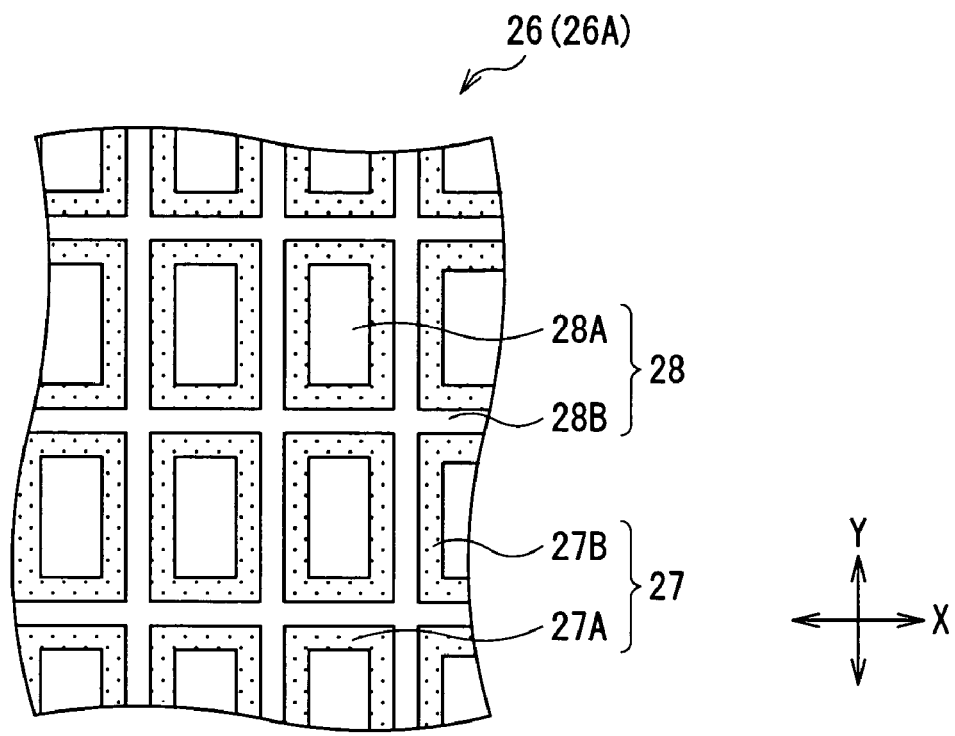
FIGS. 7A and 7B are enlarged plan views of the main part of the display device manufacturing apparatus shown in FIG. 6.

The bottom surface plate 19 and the top surface plate 20 have a pair of parallel surfaces 19S and 20S, respectively, and an uneven pattern 26 shown in FIG. 6 is formed on at least one of the pair of parallel surfaces 19S and 20S. FIG. 7A shows the detail of the uneven pattern 26. FIG. 7A shows a partly enlarged view of the uneven pattern 26A as an example of the uneven pattern 26. The uneven pattern 26A includes a projected portion pattern 27 with a flat shape corresponding to the seal pattern 4 formed in each display panel 1 and a depressed portion pattern 28 with a flat shape corresponding to a portion except for the seal pattern 4. In this case, the pair of parallel surfaces 19S and 20S indicate surfaces where the depressed portion pattern 28 is formed. In the uneven pattern 26A, the projected portion pattern 27 and the depressed portion pattern 28 are regularly arranged along an X direction and a Y direction. The projected portion pattern 27 includes a first projected portion 27A extending to the X direction and a second projected portion 27B extending to the Y direction. On the other hand, the depressed portion pattern 28 includes a first depressed portion 28A with a rectangular shape corresponding to the effective screen area 3 and a second depressed portion 28B with a grid shape. Herein, when the size of one display panel 1 is 11 mm (in the X direction)×14 mm (in the Y direction), and the width of the seal pattern 4 is 1.5 mm, it is preferable that the width of the first projected portion 27A in the Y direction is, for example, 2 mm, and the width of the second projected portion 27B in the X direction is, for example, 3 mm. Moreover, the height of the projected portion pattern 27 (that is, the depth of the depressed portion pattern 28) is preferably uniform. When the height of the projected portion pattern 27 (the depth of the depressed portion pattern 28) is uniform, the top surfaces (a surface facing the bottom substrate 2 or the top substrate 7) of the projected portion patterns 27 which are formed on the bottom surface plate 19 or the top surface plate 20 exist on the same plane.

Figure 7B:
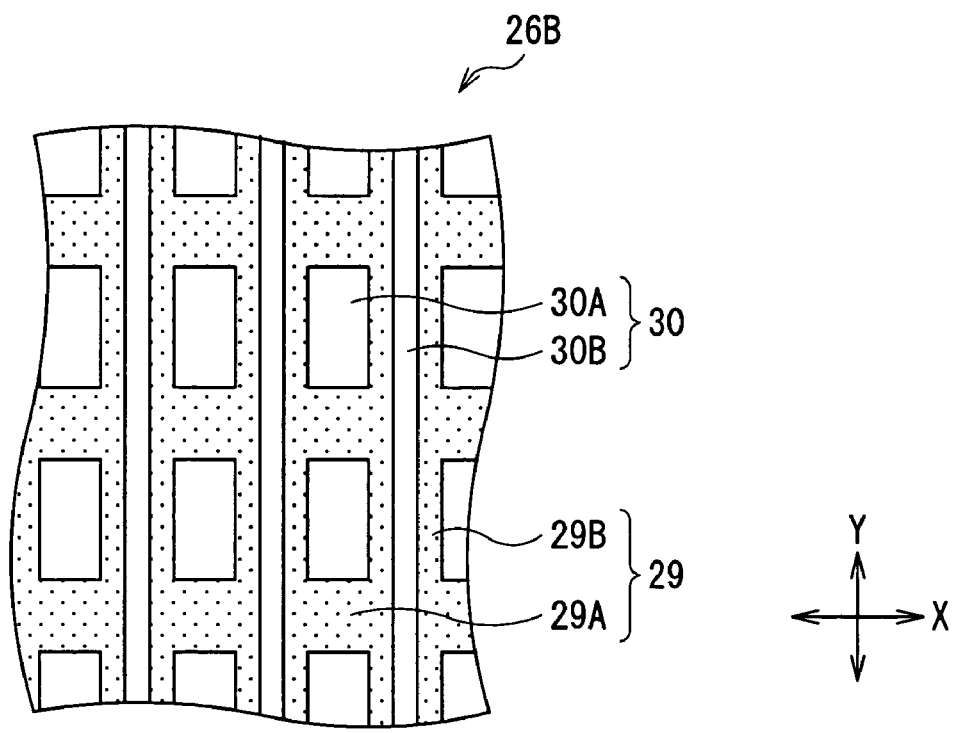

The bottom surface plate 19 and the top surface plate 20 may have a pair of parallel surfaces 19S and 20S on at least one of which the uneven pattern 26B shown in FIG. 7B is formed. The uneven pattern 26B has a planar shape corresponding to the seal pattern 4, and includes a projected portion pattern 29 and a depressed portion pattern 30. The projected portion pattern 29 includes a first projected portion 29A extending in an X direction and a second projected portion 29B extending in a Y direction. On the other hand, the depressed portion pattern 30 includes a first depressed portion 30A with a rectangular shape corresponding to the effective screen area 3 of the display panel 1 and a second depressed portion 30B with a strap shape extending in a Y direction. When the size of one display panel 1 is 11 mm (X direction)× 14 mm (Y direction), and the width of the seal pattern 4 is 1.5 mm, it is preferable that the width of the first projected portion 29A in the Y direction is, for example, 6 mm, and the width of the second projected portion 29B in the X direction is, for example, 3 mm. Moreover, as in the case of the uneven pattern 26A, the height of the projected portion pattern 29 (that is, the depth of the depressed portion pattern 30) is preferably uniform.

The position adjusting means in the bonding apparatus according to the embodiment is provided to position the bottom substrate 2 and the top substrate 7 between the pair of parallel surfaces 19S and 20S of the bottom surface plate 19 and the top surface plate 20 so that the seal pattern 4 coincides with the projected portion pattern 27 (29). The position adjusting means can include a table or the like (not shown) which is attached to, for example, the bottom surface plate 19, and is movable to two axial directions orthogonal to each other and rotatable. The bonding means can include, for example, a press plunger or the like (not shown) connected to the bottom surface plate 19. Further, the seal pattern 4 can be cured through applying ultraviolet rays R by a UV lamp from the top surface plate 20 side.

The bottom surface plate 19 has a single-layer structure or a multilayer structure which is made of at least one of metal, glass and ceramic. The top surface plate 20 is made of a material with high UV transmittance such as glass. However, in the case where the seal pattern 4 is made of, for example, a thermosetting resin or the like except for the UV curable resin, the top surface plate 20 can be made of a material such as metal or ceramic.

Next, referring to FIGS. 1A through 2, and FIGS. 4 through 9C, the display panel assembling step which is a main characteristic part in the manufacturing method according to the embodiment will be described below. The display panel assembling step in the manufacturing method according to the embodiment includes: a seal pattern forming step in which a seal pattern is formed along an outer edge of each of a plurality of display panels 1 on a facing surface of at least one of the bottom substrate 2 and the top substrate 7; a position adjusting step in which the bottom substrate 2 and the top substrate 7 are arranged between the pair of parallel surfaces 19S and 20S by using the bottom surface plate 19 and the top surface plate 20 having the pair of parallel surfaces 19S and 20S on least one of which the projected portion pattern 27 (29) with a planar shape corresponding to the seal pattern 4 is formed so that the seal pattern 4 coincides with the projected portion pattern 27; a bonding step in which pressure is applied to the bottom substrate 2 and the top substrate 7 in a direction vertical to the parallel surfaces 19S and 20S (Z direction) by using the bottom surface plate 19 and the top surface plate 20 so as to form a predetermined space between the bottom substrate 2 and the top substrate 7, and the seal pattern 4 is cured; and a cutting step in which the bottom substrate 2 and the top substrate 7 are cut into individual display panels 1. More specific description will be given below.

Figure 8:
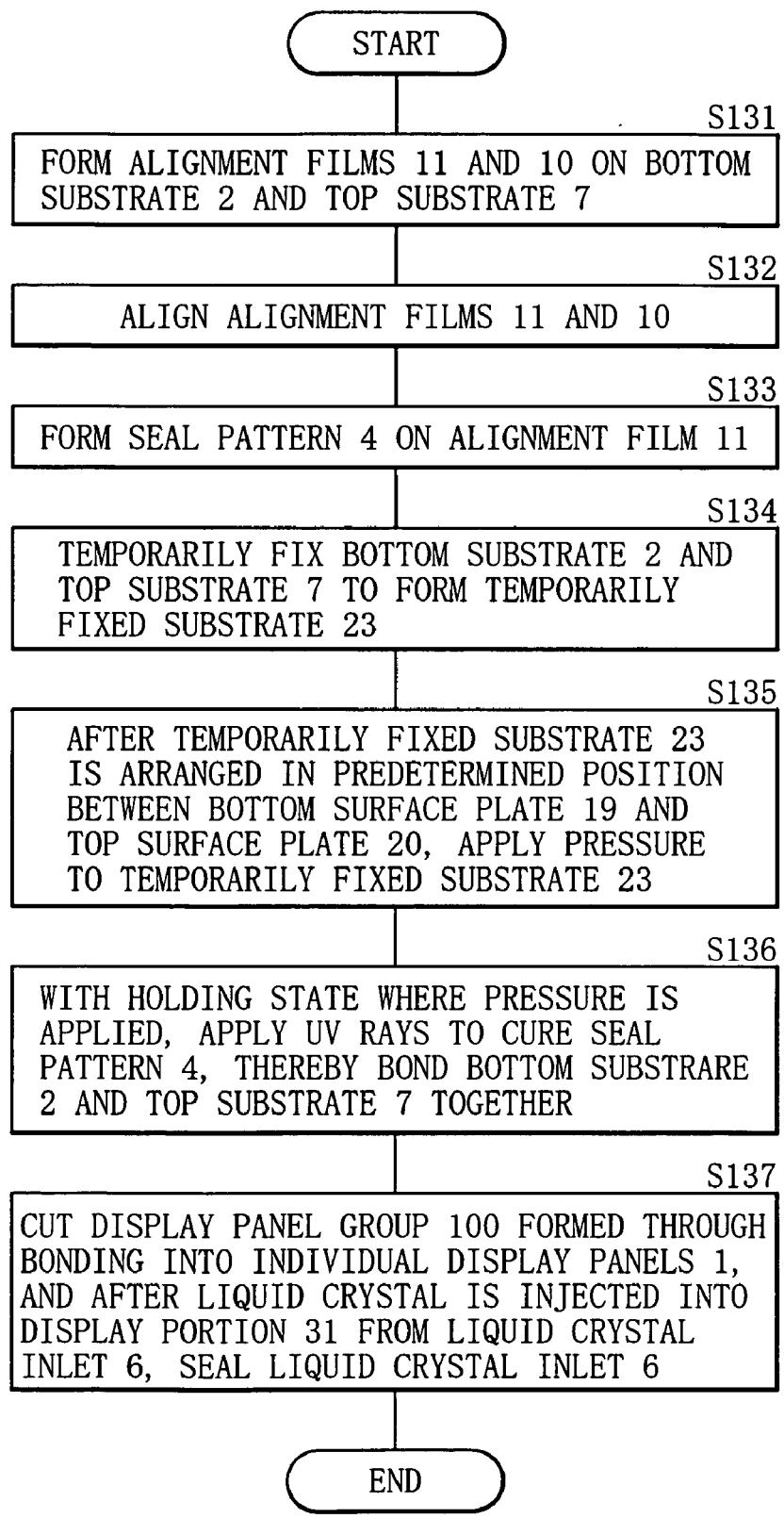
FIG. 8 is a flow chart showing a step among the steps shown in FIG. 3.

FIG. 8 shows a flow chart of specific steps in the display panel assembling step (step S103) among the above four steps (steps S101 through S104). At first, the alignment films 11 and 10 are formed on the bottom substrate 2 and the top substrate 7, respectively, which are formed in the substrate forming step (step S101) and the pattern forming step (step S102) (step S131). In the step, at first, for example, the facing surfaces of the bottom substrate 2 and the top substrate 7 are coated with a predetermined solvent in which a concentration of polyimide or polyamide acid of approximately 5 to 10 wt % is dissolved through spin coating, flexography or the like as uniformly as possible. Next, the solvent is fired and cured at a temperature of 180° C. to 200° C. through applying radiation heat, thereby the alignment films 11 and 10 are completed for the meantime.

Next, the alignment films 11 and 10 are aligned (step S132). In the step which is a so-called rubbing step, the surfaces of the alignment films 11 and 10 are rubbed with cloth or the like in a predetermined direction so as to form a plurality of parallel grooves with an extremely small depth in a predetermined direction. The alignment films 11 and 10 can be formed through oblique evaporation or the like using an inorganic material. In this case, the rubbing step is unnecessary.

Next, on the alignment film 11, the seal pattern 4 is formed (step S133). For example, the seal pattern 4 with a predetermined shape is drawn along an outer edge of the display panel 1 by a dispenser using a UV curable epoxy resin. In this case, as shown in FIG. 4, the seal patterns 4 corresponding to a plurality of display panels 1 are collectively formed on one bottom substrate 2. The height (thickness) of the seal pattern 4 in this step is, for example, 20 μm.

Figure 9A:
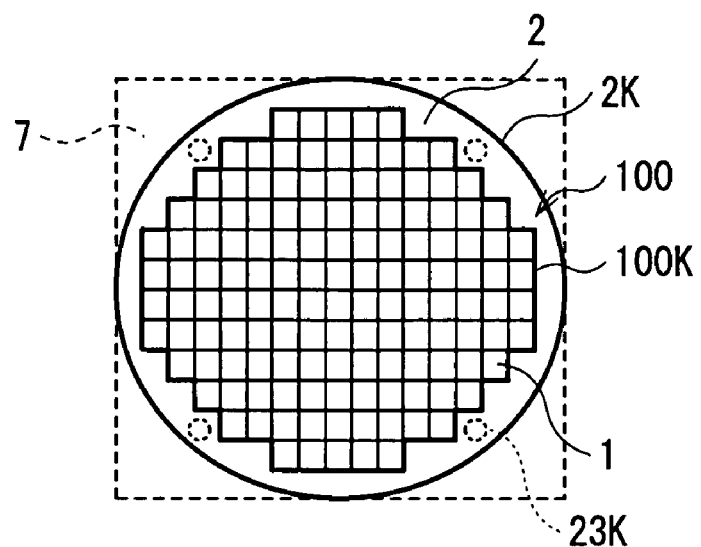
FIGS. 9A through 9C are schematic views for describing the step shown in FIG. 8.

Next, the bottom substrate 2 and the top substrate 7 are temporarily fixed to form a temporarily fixed substrate 23 (step S134). In this step, as shown in FIG. 9A, position adjustment is carried out so that the central position of the top substrate 7 coincides with the central position of the bottom substrate 2 in an in-plane direction, and, for example, a UV curable resin attached to four temporarily fixed positions 23K is half-cured to fix the bottom substrate 2 and the top substrate 7, thereby the temporarily fixed substrate 23 is formed. In this case, in order not to cure the seal pattern 9 with UV rays, UV rays are partly applied only to the UV curable resin attached to four temporarily fixed positions 23K. A space between the bottom substrate 2 and the top substrate 7 in the temporarily fixed substrate 23 is approximately 50 µm, and the space is formed so as to be sufficiently larger than the height of the seal pattern 4 at this time (for example, 20 µm).

Figure 9B:
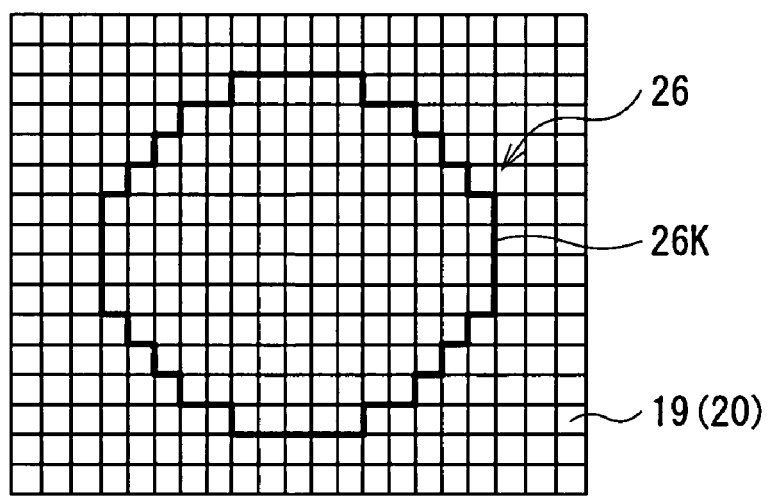
Figure 9C:
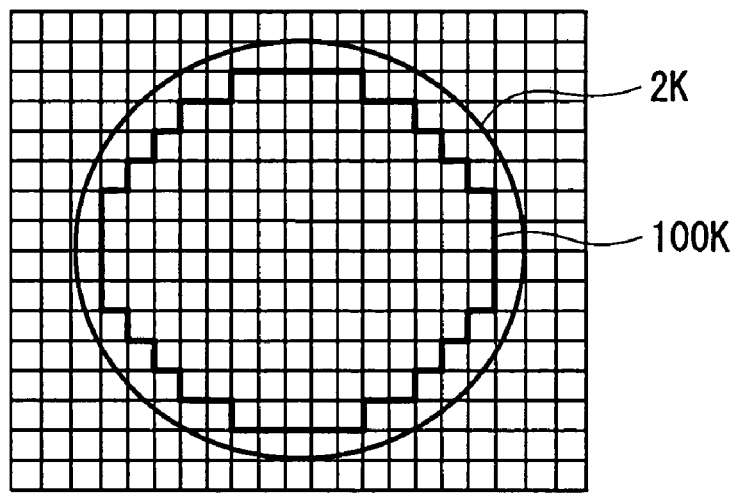

Next, the temporarily fixed substrate 23 is arranged in a predetermined position between the bottom surface plate 19 and the top surface plate 20, and pressure is applied to the temporarily fixed substrate 23 (step S135). In this step, at first, the temporarily fixed substrate 23 is inserted between the bottom surface plate 19 and the top surface plate 20 in the bonding apparatus, and the temporarily fixed substrate 23 is moved to an in-plane direction or rotated in an in-plane direction by, for example, image processing or the like so as to carry out position adjustment between an outline 100K of the display panel group 100 and an outline 26K of the uneven pattern 26 on the bottom surface plate 19 and the top surface plate 20 shown in FIG. 9B. FIG. 9B corresponds to FIG. 6, and in FIG. 9B, the projected portion pattern 27 (29) are not shown. FIG. 9C is a conceptual diagram (perspective view) showing a positional relationship between the temporarily fixed substrate 23, the bottom surface plate 19 and the top surface plate 20 in the case where such position adjustment is carried out. As shown in FIG. 9C, the outline 100K coincides with the outline 26K. Thereby, the seal pattern 4 in each display panel 1 coincides with the projected portion pattern 27 (29). In the case where the projected portion pattern 27 (29) with a width equal to or larger than the width of the seal pattern 4 is formed on each parallel surface of the bottom surface plate 19 and the top surface plate 20, a manufacturing margin is secured, so position adjustment can be more easily carried out. In this step, it is preferable to insert a buffer material 21 between the bottom surface plate 19, the top surface plate 20 and the bottom substrate 2 and the top substrate 7. The buffer material 21 is made of, for example, a rubber sheet, and an optimum thickness of the buffer material 21 is determined depending upon the hardness of the rubber, the height of the projected portion pattern 27 (29), the magnitude of pressure and so on. For example, the buffer material 21 preferably has a thickness of approximately 1 mm or less (for example, 0.5 mm), although the thickness can be changed depending upon the above conditions. When the buffer material 21 is inserted, in the case where pressure is applied, a load can be imposed more uniformly on the whole portions of the bottom substrate 2 and the top substrate 7 corresponding to the seal pattern 4. The buffer material 21 reduces bias of a pressure distribution when applying pressure and reduce an impact, so the buffer material 21 may be made of not only an elastic body such as a rubber material but also a material which has lower hardness than the bottom surface plate 19 and the bottom substrate 2 and produces plastic deformation (for example, aluminum or the like).

After adjusting the positions of the outline 100K and the outline 26K, by using the bottom surface plate 19 and top surface plate 20, pressure is applied to the bottom substrate 2 and the top substrate 7 in a direction vertical to the parallel surfaces. In this case, it is preferable to apply pressure in a multistage process, that is, with temporal steps as will be described below. At first, as a first step, pressure is preliminarily applied slowly (for example, with approximately 0.1 kg/cm$^2$ of pressure) so as not to form bubbles in the seal pattern 4, and the above state is held for a predetermined time.

Figure 10A:
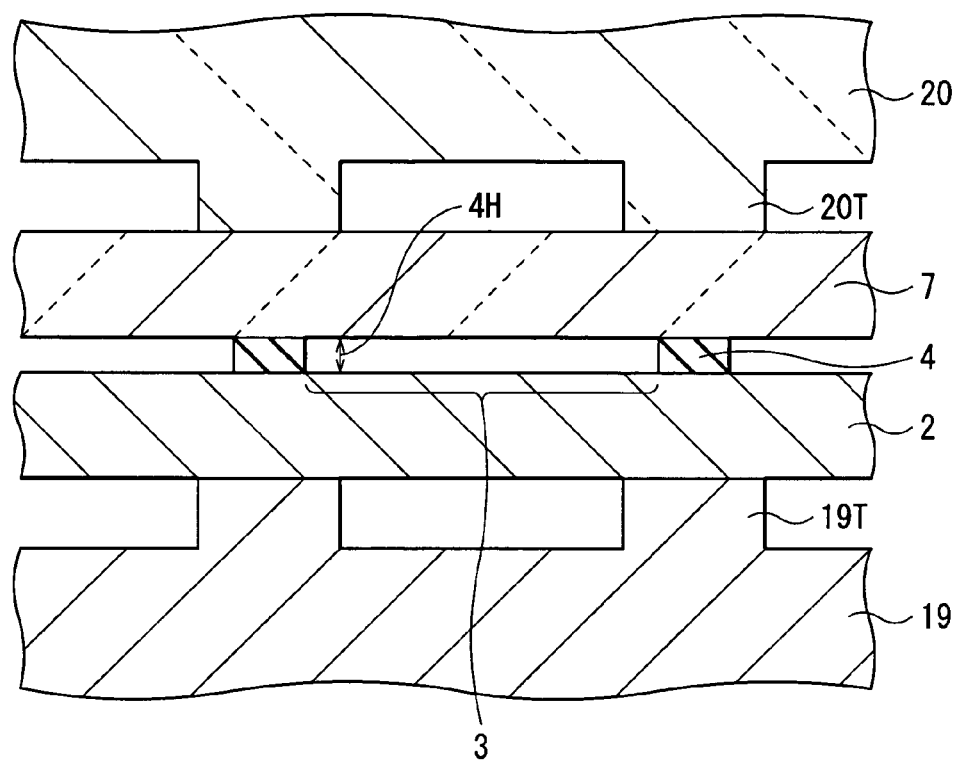
FIGS. 10A and 10B are sectional views for describing the step shown in FIG. 8.
Figure 10B:
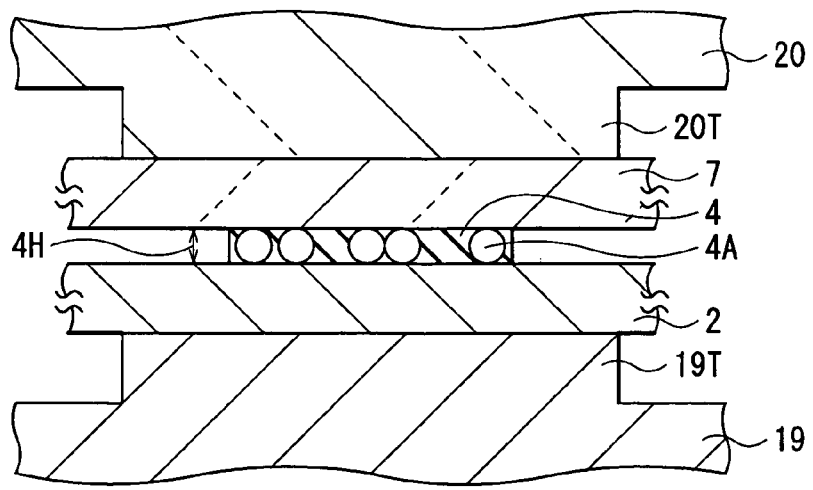

Next, as a second step, pressure is applied slowly (for example, with approximately 0.5 kg/cm$^2$ of pressure) so that a predetermined gap 4H (in the case where the spacer 4A is used, the gap 4H with a size corresponding to the diameter of the spacer 4A) is formed between the bottom substrate 2 and the top substrate 7, and the bottom substrate 2 and the top substrate 7 are held in positions where the predetermined gap 4H is formed therebetween for a predetermined time. FIG. 10A is a sectional view showing a positional relationship between the projected portion pattern 27 (29) and the seal pattern 4 in this state. In FIG. 10A, a sectional surface portion of the bottom surface plate 19 corresponding to the projected portion pattern 27 (29) is represented by a projected portion 19T, and a sectional surface portion of the top surface plate 20 corresponding to the projected portion pattern 27 (29) is represented by a projected portion 20T. As shown in FIG. 10A, in an XY plane, the projected portions 19T and 20T are arranged so as to correspond to the seal pattern 4. Therefore, while pressure is hardly applied to areas of the bottom substrate 2 and the top substrate 7 corresponding to the effective screen area 3 in each of a plurality of display panels 1, pressure can be uniformly and strongly applied to all areas corresponding to the seal patterns 4. FIG. 10B is an enlarged view of a part of FIG. 10A, and shows the state where the spacer 4A is dispersed in the seal pattern 4. As shown in FIG. 10B, the bottom substrate 2 and the top substrate 7 form the uniform gap 4H corresponding to the diameter of the spacer 4A.

After that, while holding the state where pressure is applied, ultraviolet rays R are applied to cure the seal pattern 4, thereby the bottom substrate 2 and the top substrate 7 are bonded together (step S136). In this case, for example, UV rays with a light level of 100 mW/cm$^2$ are applied to the whole display panel group 100 through the top surface plate 20 and the top substrate 7 for 60 seconds. After that, pressure is gradually reduced to complete the formation of the gap 4H.

Finally, the display panel group 100 formed through bonding the bottom substrate 2 and the top substrate 7 is cut into individual display panels 1 with a diamond cutter or a super-steel cutter, and after a predetermined liquid crystal material is injected into the display portion 31 from the liquid crystal inlet 6, the liquid crystal inlet 6 is sealed with a sealing member or the like (step S137). Thus, the display panel assembling step in the manufacturing method according to the embodiment is completed, thereby the display panel 1 is completed for the meantime.

Thus, as the display panel group 100 formed through bonding the bottom substrate 2 and the top substrate 7 is cut into individual display panels 1, display panels with a uniform gap can be efficiently manufactured while maintaining high quality and high productivity.

As described above, in the method of manufacturing a display device and the display device manufacturing apparatus according to the embodiment, after the seal pattern 4 is formed along the outer edge of each of a plurality of display panels 1, by using the bottom surface plate 19 and the top surface plate 20 having a pair of parallel surfaces 19S and 20S on at least one of which the projected portion pattern 27 (29) with a planar shape corresponding to the seal pattern 4 is formed, the positions of the bottom substrate 2, the top substrate 7, the bottom surface plate 19 and the top surface plate 20 are adjusted so that the seal pattern 4 coincides with the projected portion pattern 27 (29), and pressure is applied to the bottom substrate 2 and the top substrate 7 in a Z direction vertical to the parallel surfaces 19S and 20S by using the bottom surface plate 19 and the top surface plate 20. Therefore, while pressure is hardly applied to areas of the bottom substrate 2 and the top substrate 7 corresponding to the effective screen area 3 in each of a plurality of the display panels 1, pressure can be uniformly and strongly applied to all areas corresponding to the seal patterns 4, so even if a spacer or the like does not exist in the effective screen area 3, no depression is produced in the effective screen area 3. As a result, a space between the bottom substrate 2 and the top substrate 7, that is, the gap 4H can be uniformly secured, so a display device with higher image quality can be efficiently manufactured.

Specifically in the case where the bottom substrate 2 and the top substrate 7 have a surface roughness of 0.2 μm or less, in the bonding step, pressure can be easily and uniformly applied to portions of the bottom substrate 2 and the top substrate 7 corresponding to the seal pattern 4.

Moreover, specifically in the case where the seal pattern 4 is formed so as to include the spacer 4A, no spacer 4A exists in the effective screen area 3, so no degradation in image quality due to the spacer such as misalignment, for example, passage of light around the spacer during operation, or visual recognition of the spacer occurs.

Further, specifically in the position adjusting step and the bonding step, when the bottom surface plate and the top surface plate on which the projected portion pattern 27 (29) with a width equal to or larger than the width of the seal pattern 4 is formed are used, a margin can be secured during manufacturing, so the position adjustment can be more easily carried out.

Still further, in the case where the buffer material 21 is inserted between the bottom surface plate 19, the top surface plate 20, the bottom substrate 2 and top substrate 7, a load can be imposed more uniformly on the whole portions of the bottom substrate 2 and the top substrate 7 corresponding to the seal pattern 4, thereby a uniform gap can be formed more easily.

In addition, in the bonding step, in the case where pressure is applied to the bottom substrate 2 and the top substrate 7 in a multistage process, a uniform gap can be formed more stably.

Second Embodiment

Next, referring to FIGS. 11A and 11B, a method of manufacturing a display device and a display device manufacturing apparatus according to a second embodiment of the invention will be described below.

FIGS. 11A and 11B shows a bonding apparatus as the display device manufacturing apparatus according to the embodiment, and correspond to FIGS. 5A and 5B in the first embodiment. As in the case of FIGS. 5A and 5B, FIG. 11A shows an opened state before applying pressure, and FIG. 11B shows a state of applying pressure. In FIGS. 11A and 11B, like components are donated by like numerals in FIGS. 5A and 5B.

In the following description, mainly different points in the method of manufacturing a display device and the display device manufacturing apparatus according to the embodiment from those according to the first embodiment will be described below, and other points will not be further described.

In the first embodiment, the bottom surface plate 19 made of metal, glass, ceramic or the like is used, and the buffer material 21 made of a rubber sheet or the like is inserted between the bottom surface plate 19 and the temporarily fixed substrate 23. On the other hand, in the second embodiment, a bottom surface plate 22 with an elastic surface on which the projected portion pattern 27 (29) is formed on a parallel surface is used. More specifically, as shown in FIGS. 11A and 11B, without the buffer material 21, the bottom surface plate 22 including a rigid layer 22A and an elastic layer 22B is used.

The bottom surface plate 22 includes the rigid layer 22A and the elastic layer 22B laminated in order from a side opposite to the top surface plate 20. The rigid layer 22A is made of, for example, a metal material, and has high rigidity. A surface of the rigid layer 22A on a side closer to the elastic layer 22B is flat without projections and depressions, and a press plunger or the like as a bonding means is connected to the other surface of the rigid layer 22A. The elastic layer 22B is made of a material with a high modulus of elasticity such as rubber, and a projected portion pattern 27 (29) is formed on a surface 22S facing the top surface plate 20. More specifically, the elastic layer 22B is preferably made of NBR (nitrile rubber), polyurethane or Viton with a hardness of 50° or 70°. Moreover, the thickness of the elastic layer 22B is, for example, 2 mm to 5 mm, and in this case, the height of the projected portion pattern 27 (29) is preferably 1 mm.

Thus, in the second embodiment, the bottom surface plate 22 includes a two-layer structure of the rigid layer 22A and the elastic layer 22B, and the projected portion pattern 27 (29) with a planar shape corresponding to the seal pattern 4 is formed on the surface 22S in contact with the temporarily fixed substrate 23, so without the buffer material, while reducing bending (warping) of the temporarily fixed substrate 23, pressure can be more strongly and reliably applied to areas corresponding to the seal patterns 4 of a plurality of display panels 1.

In the second embodiment, the bottom surface plate 22 includes two layers, but may include three or more layers. However, a portion in contact with the temporarily fixed substrate 23 is required to be an elastic layer.

Next, specific examples in the first embodiment and the second embodiment will be described below.

FIRST EXAMPLE

On the basis of the manufacturing method according to the first embodiment, the display panel group 100 including 136 display panels 1 was formed on the bottom substrate 2 including the Si substrate 16 made of a large-sized silicon wafer with a diameter of 8 inches (≈203 mm). The size of one display panel 1 was approximately 14 mm×11 mm (0.7 inches diagonal). The seal pattern 4 was formed of a UV curable epoxy resin including 1.5 wt % of a silica ($SiO_2$) spacer 4A with a diameter of 1.9 mm.

When the gap 4H in each display panel 1 was measured in a state before injecting a liquid crystal, the gap 4H was 1.9 μm±3% in proximity to the seal pattern 4, and 1.9 μm±10% in a central portion of the effective screen area 3. Moreover, when the gap 4H in each display panel 1 which was completed through injecting and sealing the liquid crystal was measured, it was confirmed that in each display panel 1, the gap 4H was 1.9 μm±3% throughout the effective screen area 3.

SECOND EXAMPLE

Next, as in the case of the above first example, on the bottom substrate 2 including the Si substrate 16 made of a large-sized silicon wafer with a diameter of 8 inches (≈203 mm), the seal pattern 4 was formed of a UV curable epoxy resin including 1.5 wt % of a silica ($SiO_2$) spacer 4A with a diameter of 1.9 mm, and then 136 display panels 1 were collectively bonded by the bonding apparatus of the second embodiment shown in FIGS. 11A and 11B. The size of one display panel 1 was approximately 14 mm×11 mm (0.7 inches diagonal). When the gap 4H in each of 136 display panels 1 (before injecting a liquid crystal) was measured at that stage, the gap 4H was 1.9 μm±3% in proximity to the seal pattern 4, and 1.9 μm±10% in a central portion of the effective screen area 3. Moreover, when the gap 4H in each display panel 1 which was completed through injecting and sealing the liquid crystal was measured, it was confirmed that in each display panel 1, the gap 4H was 1.9 μm±3% throughout the effective screen area 3.

Thus, it was found out that in the manufacturing apparatus according to the first embodiment and the second embodiment and the manufacturing method using the manufacturing apparatus, a uniform gap could be formed. Moreover, it was found out that the embodiments were suitable to manufacture a display device in which as the gap 4H, a uniform gap of as small as 2.5 μm or less was required to be formed, and even if the gap 4H was reduced to approximately 1.0 μm, the gap 4H could be uniformly formed. Further, it was found out that in the case where the display panels 1 which were collectively bonded had a size of 35 mm×20 mm (1.5 inches diagonal), the gap 4H could be uniformly formed.

The display device manufactured by the manufacturing apparatus according to the first embodiment and the second embodiment and the manufacturing method using the manufacturing apparatus comprised a predetermined display panel including a display portion, and the display device comprised a first substrate and a second substrate facing each other which constituted a display panel, and a seal pattern formed in an area except for the display portion along an outer edge of the first substrate and the second substrate. The seal pattern was formed of a material including a space adjusting member, and the space adjusting member was disposed only in the seal pattern, and was not disposed in the display portion. As shown in the first example and the second example, in the display device, as an example, in the display panel of 0.7-inch or more diagonal, a space between the first substrate and the second substrate formed a uniform gap which was as small as 2 μm or less.

The present invention is described referring to the embodiments and the examples, but the invention is not limited to the embodiment and the examples, and is variously modified. For example, in the embodiments and the examples, the seal pattern is made of a UV curable resin; however the seal pattern may be made of a thermosetting resin. In this case, as a pair of surface plates, a material with high UV transmittance may not be used. Moreover, as the material of the seal pattern, not only the above material but also a material which is curable in a state where pressure is applied to the bottom substrate and the top substrate and has no adverse effect on surrounding materials such as a liquid crystal material can be applied. Further, in the case where misalignment such as passage of light which occurs due to the presence of the spacer in the effective screen area does not cause degradation in image quality, the spacer may be dispersed in the effective screen area, and in this case, a more uniform gap can be formed. Further, in the embodiments and the examples, the surface plate on the bottom substrate side is moved to carry out bonding; however, the surface plate on the top substrate side may be moved.

Moreover, in the embodiments and the examples, a pair of surface plates have a pair of parallel surfaces on at least one of which the projected portion pattern with a planar shape corresponding to the seal pattern is formed; however, the projected portion pattern is preferably formed on both parallel surfaces. Moreover, the height of the projected portion pattern (that is, the depth of the depressed portion pattern) is preferably uniform; however, depending upon the shape of the seal pattern, the height may be changed so as to uniformly apply pressure.

The size of each portion of the projected portion pattern in the invention is preferably determined by the position and the width of the seal pattern, the amount of the space adjusting member included in the seal pattern, and the surface roughness, bending or the like of each substrate.

As described above, in the display device manufacturing apparatus according to the invention, position adjustment is carried out so that the seal pattern which is formed on at least one of a pair of facing surface of the first substrate and the second substrate and has a shape along the outer edge of the display area in each of a plurality of display panels coincides with the projected portion pattern which is formed on at least one of a pair of parallel surfaces of the first substrate and the second substrate and has a planar shape corresponding to the seal pattern, and pressure is applied to the first substrate and the second substrate in a direction vertical to the parallel surfaces by using a pair of surface plates. Therefore, a gap between the first substrate and the second substrate, that is, a gap in the effective screen area can be uniformly secured, so a display device with higher image quality can be efficiently manufactured.

Specifically in the seal pattern forming step, in the case where the first substrate and the second substrate which have a surface roughness of 0.2 μm or less are used, uniform pressure can be more easily applied to portions of the first substrate and the second substrate corresponding to the seal pattern.

Moreover, specifically in the seal pattern forming step, in the case where the seal pattern is formed of a material including the space adjusting member, a uniform gap can be formed without degradation in image quality due to the space adjusting member.

Specifically in the position adjusting step and the bonding step, in the case where a pair of surface places on which the projected portion pattern with a width equal to or larger than the width of the seal pattern is formed are used, a manufacturing margin can be secured, so position adjustment can be more easily carried out. As a result, pressure can be more reliably applied to only an area corresponding to the seal pattern, and a uniform gap can be easily formed.

Specifically in the position adjusting step, in the case where the buffer material is inserted between a pair of surface plates, the first substrate and the second substrate, pressure can be more uniformly applied to the whole portions of the first substrate and the second substrate corresponding to the seal pattern, and a uniform gap can be easily formed.

Specifically in the position adjusting step and the bonding step, in the case where as at least one of the pair of surface plates, a surface plate with an elastic surface on which the projected portion pattern is formed is used, without the buffer material, while reducing bending or the like of the first substrate and the second substrate, pressure can be more strongly and reliably applied to all areas corresponding to the seal patterns in a plurality of display panels.

Specifically in the bonding step, in the case where pressure is applied to the first substrate and the second substrate in a multistage process, a uniform gap can be formed more stably.

Specifically, in the case where the projected portion pattern with a width equal to or larger than the width of the seal pattern is formed, a manufacturing margin is secured, so position adjustment can be more easily carried out. As a result, pressure can be more reliably applied to only an area corresponding to the seal pattern, and a uniform gap can be easily formed.

Specifically in the case where at least one of a pair of surface plates has an elastic surface on which the projected portion pattern is formed, while reducing bending or the like of the first substrate and the second substrate, pressure is more strongly and reliably applied to all areas corresponding to the seal patterns in a plurality of display panels.

The invention claimed is:

1. A method of manufacturing a display device, the display device comprising a display panel having a predetermined display area, the method comprising:
    a seal pattern forming step of forming a plurality of seal patterns each along an outer edge of a display area in each of a plurality of the display panels on at least one of a pair of facing surfaces of a first substrate and a second substrate facing each other;
    a position adjusting step of using a pair of surface plates having a pair of parallel surfaces on at least one of which a projected portion pattern with a planar shape corresponding to each of the plurality of seal patterns and a depressed portion pattern with a planar shape corresponding to a portion between the plurality of display panels adjacent to each other and a portion except for the seal patterns of the plurality of the display panels are formed to adjust positions of the first substrate and the second substrate between the pair of parallel surfaces so that the seal pattern coincides with the projected portion pattern; and
    a bonding step of bonding the first substrate and the second substrate arranged in the position adjusting step together through applying a first pressure to the first substrate and the second substrate in a direction vertical to the parallel surfaces by the pair of surface plates so as to have a predetermined space between the first substrate and the second substrate, and curing the seal pattern.

2. A method of manufacturing a display device according to claim 1, further comprising:
    a cutting step of cutting the first substrate and the second substrate into each display panel.

3. A method of manufacturing a display device according to claim 1, wherein
    in the seal pattern forming step, as either the first substrate or the second substrate, a silicon substrate on which a semiconductor device for display control is formed is used.

4. A method of manufacturing a display device according to claim 1, wherein
    in the seal pattern forming step, as at least one of the first substrate and the second substrate, a glass substrate on which a transparent electrode is formed is used.

5. A method of manufacturing a display device according to claim 1, wherein
    the first substrate and the second substrate which have a different shape from each other are used, and
    in the bonding step, the first substrate and the second substrate are temporarily fixed to form a temporarily fixed substrate.

6. A method of manufacturing a display device according to claim 1, wherein
    in the seal pattern forming step, as the second substrate, a substrate with V transmittance is used, and the seal pattern is formed of an ultraviolet curable resin, and
    in the bonding step, as one of the pair of surface plates on a side corresponding to the second substrate, a surface plate with UV transmittance is used, and while applying the first pressure, ultraviolet rays are applied to the seal pattern through the surface plate with UV transmittance and the second substrate to cure the seal pattern.

7. A method of manufacturing a display device according to claim 6, wherein
    in the bonding step, after the first pressure is applied, a second pressure higher than the first pressure is applied and held.

8. A method of manufacturing a display device according to claim 1, wherein
    in the seal pattern forming step, the seal pattern is formed of a thermosetting resin, and
    in the bonding step, while applying the first pressure, heat is applied to the seal pattern to cure the seal pattern.

9. A method of manufacturing a display device according to claim 1, wherein
    in the seal pattern forming step, the first substrate and the second substrate having a surface roughness of 0.2 μm or less are used.

10. A method of manufacturing a display device according to claim 1, wherein
    in the seal pattern forming step, the seal pattern is formed of a material in which a space adjusting member is dispersed.

11. A method of manufacturing a display device according to claim 1, wherein
    in the position adjusting step and the bonding step, the pair of surface plates on which the projected portion pattern with a width equal to or larger than the width of seal pattern are used.

12. A method of manufacturing a display device according to claim 1, wherein
    in the position adjusting step, a buffer material is inserted between the pair of surface plates, the first substrate and the second substrate.

13. A method of manufacturing a display device according to claim 1, wherein:
    in the position adjusting step and the bonding step, as at least oen of the pair of surface plates, a surface plate with an elastic surface on which the projected portion pattern is formed is used.

14. A method of manufacturing a display device according to claim 1, wherein
    in the bonding step, pressure is applied to the first substrate and the second substrate in a multistage process.

* * * * *